United States Patent
Eleftheriou et al.

(10) Patent No.: US 7,405,898 B2
(45) Date of Patent: Jul. 29, 2008

(54) SYSTEM AND METHOD FOR GENERATING A POSITION ERROR SIGNAL (PES) REFERENCE CURVE IN A DATA STORAGE DEVICE

(75) Inventors: Evangelos S. Eleftheriou, Zurich (CH); Angeliki Pantazi, Kilchberg (CH); Charalampos Pozidis, Gattikon (CH); Abu Sebastian, Addiswil (CH)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 11/424,078

(22) Filed: Jun. 14, 2006

(65) Prior Publication Data

US 2007/0291402 A1 Dec. 20, 2007

(51) Int. Cl.
*G11B 5/596* (2006.01)
(52) U.S. Cl. .............. 360/77.07; 360/31; 360/77.02
(58) Field of Classification Search .............. None
See application file for complete search history.

(56) References Cited

U.S. PATENT DOCUMENTS

| | | | | |
|---|---|---|---|---|
| 5,576,906 A | * | 11/1996 | Fisher et al. | 360/77.08 |
| 5,723,033 A | * | 3/1998 | Weiss | 204/192.15 |
| 5,872,676 A | * | 2/1999 | Smith et al. | 360/77.03 |
| 6,046,879 A | * | 4/2000 | Hampshire | 360/77.08 |
| 6,628,598 B2 | * | 9/2003 | Edwards et al. | 369/99 |
| 6,657,809 B2 | * | 12/2003 | Ottesen et al. | 360/77.03 |
| 6,753,043 B1 | * | 6/2004 | Kuo et al. | 427/526 |
| 2004/0061968 A1 | * | 4/2004 | Fukushima et al. | 360/75 |
| 2007/0047427 A1 | * | 3/2007 | Cherubini et al. | 369/126 |

\* cited by examiner

*Primary Examiner*—K. Wong
(74) *Attorney, Agent, or Firm*—Daryl Neff; Eustus Nelson

(57) ABSTRACT

System and method for generating a Position Error Signal (PES) reference curve in data storage devices are provided. The method includes scanning a distance of at least one Track Pitch (TP) in a cross-track direction in each servo-burst along a predefined path. One or more TPs in each servo-burst are scanned with a read head. The method further includes, calculating a plurality of samples of each differential signal. A differential signal corresponds to a first read-back signal and a second read-back signal. Thereafter, a plurality of normalized signals are determined. A normalized signal is determined by dividing each sample of the differential signal with a normalization constant. The plurality of normalized signals are combined to generate the PES reference curve.

13 Claims, 4 Drawing Sheets

SYSTEM AND METHOD FOR GENERATING A POSITION ERROR SIGNAL (PES) REFERENCE CURVE IN A DATA STORAGE DEVICE

FIELD OF THE PRESENT INVENTION

The present invention relates to a data storage device. More specifically, the present invention relates to generating a Position Error Signal (PES) reference curve in a data storage device.

BACKGROUND OF THE PRESENT INVENTION

In a previously-proposed data storage device, data is stored on a storage medium along Track Center Lines (TCLs) of the data storage device. The data is read/written by moving each read-head along a TCL of a data-track relative to the storage medium. The data may be read/written by moving the storage medium relative to each read head, such that each read head moves along a TCL of a data-track. However, it may be that a read-head may be moved along a line that has an offset from a TCL of a data-track. A PES corresponding to a position of read-heads is obtained for the data storage device when the data is read/written. The PES is converted into a position offset of each read-head from a TCL of a data-track. The position offset is used to move each read-head on a TCL of a data-track.

In a previously-proposed data storage device, for example, a hard disk device, PES is generated based on read-back signals obtained by scanning corresponding servo-bursts on a storage medium. Servo-bursts are magnetic fields that are pre-written on the storage medium during manufacturing of a hard disk drive. In one possible configuration, the servo-bursts are positioned off-track with data-tracks such that, a TCL of a data-track coincides with a boundary of a servo-burst. Further, a servo-burst, a data-track and a read-head have comparable cross-track widths. Therefore, when a read-head moves on a TCL of a data-track, equal portions of a first servo-burst and a second servo-burst are scanned by the read-head. Boundaries of the first servo-burst and the second servo-burst coincide with a TCL of the data-track.

The read head obtains a first read-back signal from a first servo-burst and a second read-back signal from a second servo-burst. The first read-back signal is zero if the read-head is entirely placed on the second servo-burst. Similarly, the second read-back signal is zero if the read-head is entirely placed on the first servo-burst. Thereafter, the PES is obtained by dividing the difference of the first read-back signal and the second read-back signal by the sum of the first read-back signal and the second read-back signal. The sum of the first read-back signal and the second read-back signal is constant as the read-head has a cross-track width comparable to each of data-track, the first servo-burst, and the second servo-burst.

However, in probe based data storage devices, a width of a read-head is considerably smaller than a width of a servo-burst and a data-track and data is written as a plurality of topographical features. Examples of the topographical features may include, but are not limited to indentations, trenches, and bumps. Therefore, the method used for calculating PES in hard disk drives is not effective in probe based data storage devices. This is because the sum of the first read-back signal and the second read-back signal is not constant across the entire cross-track distance between adjacent tracks.

The PES for a probe based data storage device can be calculated using the method of calculating PES in hard disk drives provided a constant sum for the first read-back signal corresponding to the first servo-burst and the second read-back signal corresponding to the second-burst can be obtained. The constant sum can be obtained by placing a topographical feature of the first servo-burst at a predefined distance from a corresponding topographical feature of the second servo-burst.

However, placing a topographical feature of the first servo-burst at a predefined distance from a corresponding topographical feature of the second servo-burst usually leads to partial erasing of the topographical features. Additionally, tips of the read-heads wear down and the topographical features tend to change shape with time. This leads to a distortion in the read-back signals over time.

SUMMARY OF THE PRESENT INVENTION

An object of the present invention is to provide a method and system for generating a Position Error Signal (PES) reference curve in probe based data storage devices. The PES reference curve is used to determine an offset of each read-head from a TCL of a data-track in a corresponding storage field.

Another object of the present invention is to provide a method and system in which placement of tracks in a storage medium of a probe based data storage device is independent of a width of a read head.

Yet another object of the present invention is to provide a method and system that generates a PES that may be used for determining an offset of a read-head from a TCL of a data-track in a corresponding storage field in spite of variation in shape of topographical features and tips of read-heads.

The above listed objectives are achieved by providing a system and method for generating a PES reference curve in a data storage device. The method includes scanning a distance of one or more Track Pitches (TPs) in a cross-track direction in each servo-burst along a predefined path. A TP is a vertical cross-track distance between adjacent Track Centre Lines (TCLs) in a storage field. Each servo-burst is pre-written on a storage medium in the data storage device. Each servo-burst comprises one or more servo-tracks. Each servo-track includes a plurality of topographical features. Data is stored on the storage medium as the plurality of topographical features. One or more TPs in a servo-burst are scanned with a read head. The method further includes, calculating a plurality of samples of each differential signal. A differential signal corresponds to a first read-back signal and a second read-back signal. A sample of the differential signal is equal to a difference between a corresponding first amplitude and a second amplitude. The first amplitude is computed for a first read-back signal corresponding to a first servo-burst, the second amplitude is computed for a second read-back signal corresponding to a second servo-burst. A servo-track of the first servo-burst has an offset of TP/2 in the cross-track direction relative to a servo-track of the second servo-burst. An amplitude of a read-back signal is computed when a read head is moving parallel to one or more servo-tracks of a servo-burst.

Thereafter, a plurality of normalized signals are determined. A normalized signal is determined by dividing each sample of each differential signal by a normalization constant. The normalization constant is an average of a maximum magnitude of the first read-back signal and a maximum magnitude of the second read-back signal. The plurality of normalized signals are combined to generate the PES reference curve. The plurality of normalized signals are combined using an algorithm.

The system includes a storage medium, one or more transducers, a plurality of read-heads, an amplitude module, a normalization module and a controller to perform the above-listed method steps.

BRIEF DESCRIPTION OF THE DRAWINGS

The foregoing objects and advantages of the present invention for generating a Position Error Signal (PES) reference curve in a data storage device may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
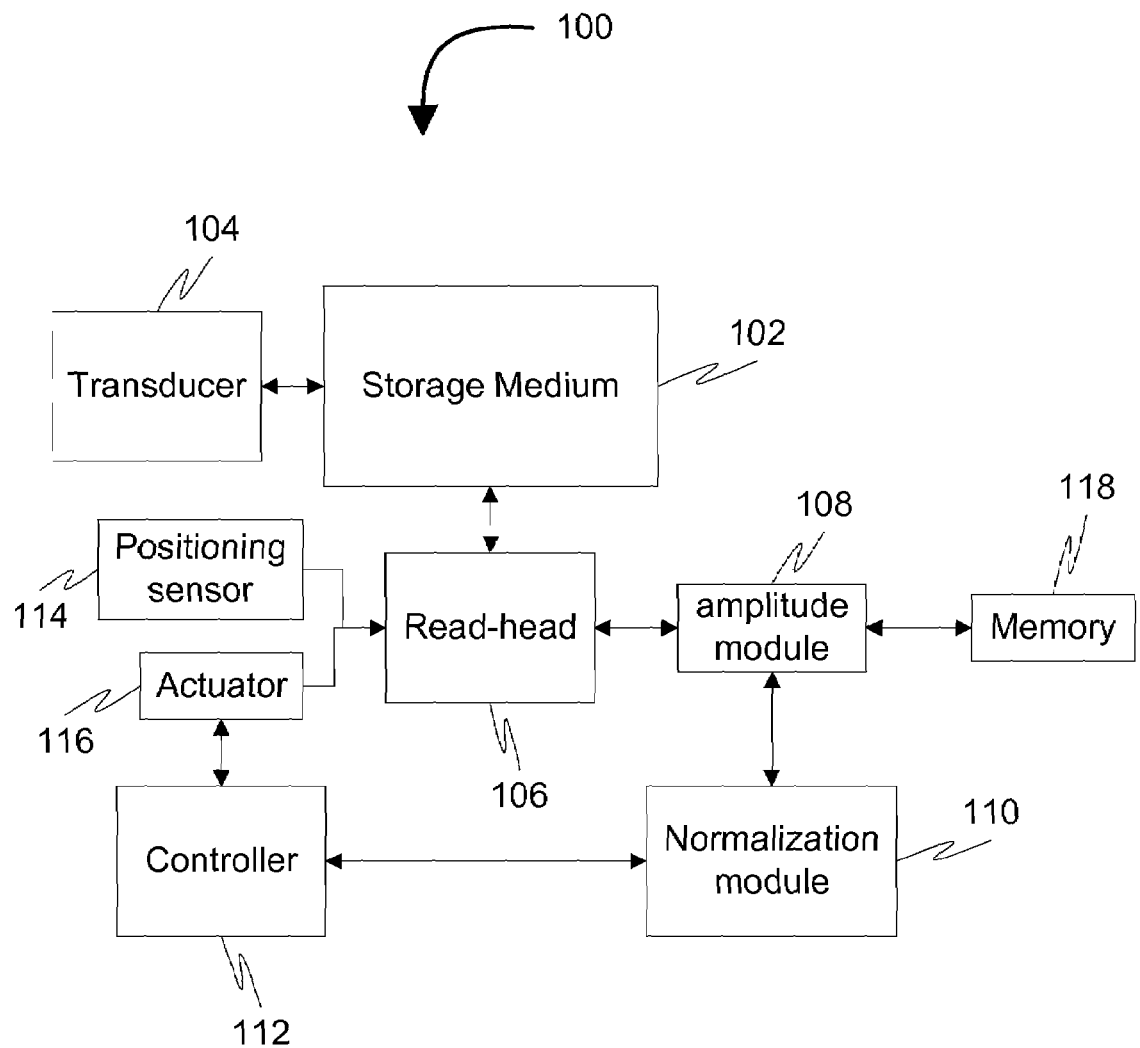
FIG. 1 is a block diagram showing a system for storing data, in accordance with an embodiment of the present invention.

Before describing in detail embodiments that are in accordance with the present invention, it should be observed that the embodiments reside primarily in combinations of method steps and system components for generating a Position Error Signal (PES) reference curve in a data storage device. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

Relative terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein.

Various embodiments of the present invention provide a method and system for generating a Position Error Signal (PES) reference curve in a data storage device. The data storage device comprises a plurality of read heads and a storage medium. The storage medium is divided into a plurality of storage fields. Each read head is assigned to a storage field. A storage field includes one of one or more servo-bursts and one or more data-tracks. Each servo-burst in a storage field is displaced from the remaining servo-bursts in a cross-track direction. Therefore, each read head in a first set of read heads scans each storage field that includes one or more servo-burst. Further, each read head in a second set of read heads scans each storage field that includes one or more data-tracks.

FIG. 1 is a block diagram showing a system 100 for storing data, in accordance with an embodiment of the present invention. In various embodiments of the present invention, system 100 is a data storage device. Those of skill in the art will, however, appreciate that the present invention is not limited to the above-mentioned example, and the present invention shall have full scope of the field.

System 100 includes a storage medium 102, one or more transducers (for example, a transducer 104), a plurality of read heads (for example, a read-head 106), an amplitude module 108, and a normalization module 110, and a controller 112. Storage medium 102 stores data in one or more servo-tracks as a plurality of topographical features. Each servo-burst include one or more servo-tracks and is pre-written on storage medium 102. The data stored on one or more servo-tracks of each servo-burst corresponds to device-data. Device-data stored on a servo-burst cannot be modified and is used for calibration of a data storage device. Storage medium 102, further stores data on one or more data-tracks as a plurality of topographical features. The data stored on one or more data-tracks corresponds to user-data. The user-data can be erased and re-written.

One or more transducers are used to write data on storage medium 102. The plurality of read-heads read data stored on storage medium 102. The plurality of read-heads include the first set of read heads and the second set of read-heads. The first set of read-heads, for example, includes a first read head and a second read head. The first read head is assigned to a first storage field and the second read head is assigned to a second storage field. The first storage field includes a first servo-burst and the second storage field includes a second servo-burst. Similarly, the second set of read heads, for example, includes a third read head and a fourth read head. The third read head is assigned to a third storage field and the fourth read head is assigned to a fourth storage field. Each of the third storage field and the fourth storage field include one or more data-tracks.

A positioning sensor 114 is used to assist an actuator in placing each read-head on a starting point of a corresponding servo-burst using a positioning signal. For example, the first read head is placed at a starting point of the first servo-burst and the second read-head is placed at a starting point of the second servo-burst. Thereafter, each read head is used to scan a distance of one or more Track Pitches (TPs) in a cross-track direction in a servo-burst along a predefined path. For example, the first read head scans one or more TPs in the first servo-burst and the second read head scans one or more TPs in the second servo-burst.

The predefined path includes periodically moving a read head parallel to one or more servo-tracks in a servo-burst for a first predefined time. Thereafter, the read head is moved perpendicular to one or more servo-tracks of the servo-burst for a second predefined time. The predefined path is further explained in detail in conjunction with FIG. 2. In an embodiment of the present invention, an actuator 116 moves each read head relative to storage medium 102 in system 100. In another embodiment of the present invention, actuator 116 moves storage medium 102 relative to each read head in system 100.

While scanning a servo-burst, each read head in the first set of read heads reads data stored in one or more servo-tracks of a servo-burst and generates a corresponding read back signal. A read back signal corresponds to device-data stored in one or more servo-tracks of a servo-burst. For example, the first read head generates a first read back signal corresponding to the device-data stored in one or more servo-tracks of the first servo-burst and the second read head generates a second read back signal corresponding to the device-data stored in one or more servo-tracks of the second servo-burst. Data is read when a read head is parallel to one or more servo-tracks of a corresponding servo-burst.

Thereafter, amplitude module 108 computes a plurality of amplitudes of each read-back signal. For example, a plurality of amplitudes are computed for each of the first read-back signal and the second read-back signal. An amplitude is computed when the read head is parallel to one or more servo-tracks of the servo-burst. An amplitude of a read-back signal corresponds to a cross-track distance of the read head relative to one or more topographical features on one or more servo-tracks of a corresponding servo-burst. This is explained in detail in conjunction with FIG. 2. The plurality of amplitudes of each read-back signal are stored in a memory 118 of system 100.

Based on the plurality of amplitudes stored in memory 118, amplitude module 108 calculates a plurality of samples of each differential signal. A differential signal corresponds to the first read-back signal and the second read-back signal. A sample of the differential signal is equal to a difference between a first amplitude, which is computed for the first read-back signal and a second amplitude, which is computed for the second read-back signal. In an embodiment of the present invention, a servo-track of the first servo-burst has an offset of TP/2 in a cross-track direction relative to a servo-track of the second servo-burst. This is further explained in detail in conjunction with FIG. 2.

Thereafter, normalization module 110 divides each sample of each differential signal with a normalization constant to determine a plurality of normalized signals. For example, each sample of a differential signal corresponding to the first read-back signal and the second read-back signal is divided by the normalization constant to determine a normalized signal. The normalization constant is an average of a maximum magnitude of the first read-back signal and a maximum magnitude of the second read-back signal. A magnitude of a read-back signal corresponds to an absolute value of an amplitude of the read-back signal. This is explained in conjunction with FIG. 2.

Controller 112 combines the plurality of normalized signals to generate a PES reference curve using an algorithm. This is explained in detail in conjunction with FIG. 2. Thereafter, controller 112 multiplies each value of the PES reference curve with a predefined value that is proportional to the TP. In an exemplary embodiment of the present invention, controller 112 multiplies each value of the PES reference curve with TP/2. Each value of the PES reference curve is therefore, converted to an offset of a read head from a Track Centre Line (TCL) of a data-track in a storage field corresponding to the read head. For example, each PES reference curve value is converted to an offset of the third read-head from a TCL of a data-track in the third storage field. Similarly, each PES reference curve value is converted to an offset of the fourth read-head from a TCL of a data-track in the fourth storage field. The TCL of each data-track in the third storage field is aligned with TCL of the corresponding data-track in the fourth storage field. A TCL of a track (one of a data-track and a servo-track) is a line that horizontally joins centers of a plurality of topographical features on the track.

Actuator 116 then moves each read head relative to storage medium 102 based on the offset of each read head in the second set of read heads from a TCL of a corresponding data-track obtained from controller 112, such that each read head moves on a TCL of a corresponding data-track. For example, actuator 116 moves the third read-head based on the offset obtained from controller 112, such that the third read-head moves on TCL of a data-track in the third storage field. This is further explained in conjunction with FIG. 2.

Therefore, an offset of each read head from a TCL of a data-track in a corresponding storage-field is corrected and each read-head is placed on a TCL of a data-track in the corresponding storage-field. Method for generating a PES reference curve in the data storage device is explained hereinafter.

Figure 2:
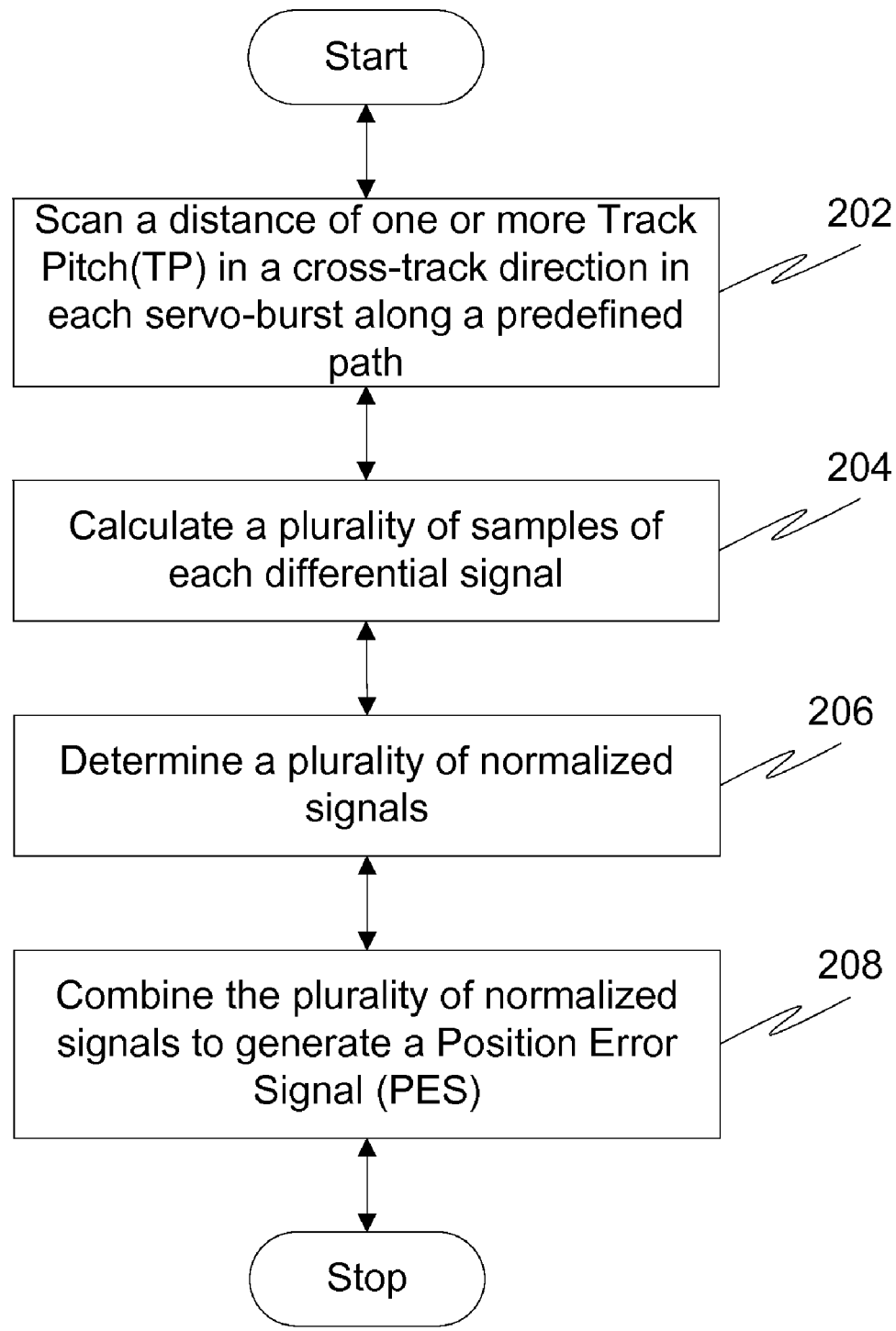
FIG. 2 is a flowchart of a method for generating a Position Error Signal (PES) reference curve in a data storage device, in accordance with an embodiment of the present invention.

FIG. 2 is a flowchart of a method for generating a PES reference curve in a data storage device, in accordance with an embodiment of the present invention. At power up of the data storage device, each read-head in the data storage device is placed at a starting-point of a servo-burst using a positioning signal. Positioning sensor 114 in the data storage device supplies the positioning signal. Examples of positioning sensor 114 may include, but are not limited to, thermal sensor, and capacitive sensor.

After positioning each read head at the starting point of a servo-burst, a read-head scans a distance of one or more TPs in a cross-track direction in each servo-burst along the predefined path, at step 202. In an embodiment of the present invention, one or more TPs are scanned in the cross-track direction in each servo-burst along the predefined path when the data storage device is powered up. In another embodiment of the present invention, one or more TPs in each servo-burst are periodically scanned in the cross-track direction in each servo-burst along the predefined path after a predefined time period.

Each servo-burst is pre-written on storage medium 102 in the data storage device. Each servo-burst includes one or more servo-tracks. Each servo-track includes a plurality of topographical features. Data is stored on storage medium 102 as the plurality of topographical features. The data stored on one or more servo-tracks correspond to device-data. This has been explained in conjunction with FIG. 1.

The predefined path along which each read-head scans a distance of one or more TPs includes periodically moving a read head parallel to one or more servo-tracks in a servo-burst for the first predefined time. Thereafter, the read-head is moved perpendicular to one or more servo-tracks in the servo-burst for the second predefined time. The read-head is moved perpendicular after each movement of the read-head parallel to one or more servo-tracks. The second predefined time for perpendicular motion of a read-head is a fraction of the first predefined time for parallel motion of the read-head.

While scanning a distance of one or more TPs in a cross-track direction in each servo-burst a read-back signal is obtained corresponding to each servo-burst. At the same time, a plurality of amplitudes are computed for each read-back signal. An amplitude of each read-back signal for a servo-burst is computed when a read-head is parallel to one or more servo-tracks of the servo-burst. For example, an amplitude of the first read-back signal is computed when the first read-head is parallel to one or more servo-tracks in the first servo-burst. The plurality of amplitudes are stored in memory 118.

Each amplitude of a read-back signal corresponds to the cross-track distance of a read-head, which is used to scan a servo-burst, relative to one or more topographical features on the servo-track of the servo-burst, which is closest to the read-head in the cross-track direction. In an embodiment of the present invention, a magnitude of a read-back signal for a servo-burst is maximum, when a read head is on a TCL of a servo-track in the servo-burst. Further, a magnitude of a read-back signal for a servo-burst decreases with increase in distance of the read-head relative to the TCL of the closest servo-track to the read-head in the servo-burst. For example, a magnitude of the first read-back signal increases, if the cross-track distance of the first read-head relative to the TCL of a servo-track in the first servo-burst decreases. Similarly, a magnitude of the first read-back signal decreases, if the cross-track distance of the first read-head relative to the TCL of a servo-track in the first servo-burst increases.

Thereafter, based on the plurality of amplitudes stored in memory 118, a plurality of samples of each differential signal are calculated, at step 204. A differential signal corresponds to the first read-back signal and the second read-back signal. A differential signal may include, but is not limited to an in-phase signal and a quadrature signal. A quadrature signal has a 90-degree phase-shift with respect to an in-phase signal. Therefore, local extrema of a quadrature signal coincide with zeroes of an in-phase signal. Similarly, local extrema of an in-phase signal coincide with zeroes of a quadrature signal. A sample of the differential signal is equal to a difference between a first amplitude, which is computed for the first read-back signal and a second amplitude, which is computed for the second read-back signal. The first read-back signal corresponds to the first servo-burst and the second read-back signal corresponds to the second servo-burst. In an embodiment of the present invention, a track of the first servo-burst has an offset of TP/2 with respect to a track of the second servo-burst. As a result of this, the first read-back signal has a maximum magnitude when the second read-back signal has a minimum magnitude. Similarly, the second read-back signal has a minimum magnitude when the first read-back signal has a maximum magnitude. This is further explained in detail in conjunction with FIG. 4.

Each sample of each differential signal is divided by a normalization constant to determine a plurality of normalized signals, at step 206. The normalization constant is a weighted average of a maximum magnitude of the first read-back signal and a maximum magnitude of the second read-back signal. For example, the maximum magnitude of the first read-back signal is A, and the maximum magnitude of the second read-back signal is B. Therefore, in an embodiment of the present invention, the normalization constant is equal to (A+B)/2. This is further explained in detail in conjunction with FIG. 4. In an embodiment of the present invention, a normalization constant is obtained for each of an in-phase signal and a quadrature signal. Therefore, an in-phase-normalization-constant is used to determine a normalized in-phase signal and a quadrature-normalization-constant is used to determine a normalized quadrature signal.

Thereafter, the plurality of normalized signals are combined to generate the PES reference curve using an algorithm, at step 208. The plurality of normalized signals include one or more of the normalized in-phase signal and a normalized quadrature signal. In an exemplary embodiment of the present invention, a PES reference curve is generated from the plurality of normalized signals using the following equation:

$$PES[k]=0.5*sgn(xq[k])*(xi[k]-1.0) \quad (1)$$

where,

PES[k] is a sample of the PES reference curve, xq[k] is a sample of a normalized quadrature signal, xi[k] is a sample of a normalized in-phase signal, and sgn is the signum function.

In this exemplary embodiment of the present invention, if each of xq[k] and xi[k] take values that range from −1 to +1, then PES[k] has values in the range −1 to +1.

Each value of the PES reference curve is multiplied with a predefined value that is proportional to TP and is represented as a position offset of a read-head from a TCL of a data-track. In an exemplary embodiment of the present invention, the predefined value is TP/2. As a data-track of the third storage field is aligned with a corresponding data-track of the fourth storage field, therefore, the position offset of each read head from a TCL of a data-track in a corresponding storage field is same. Each data-track stores user-data as a plurality of topographical features. This has been explained in conjunction with FIG. 1. The position offset is thereafter used by actuator 116 to move each read-head in tandem, so that each read head in the second set of read heads moves on a TCL of a data-track in a corresponding storage field.

Figure 3:
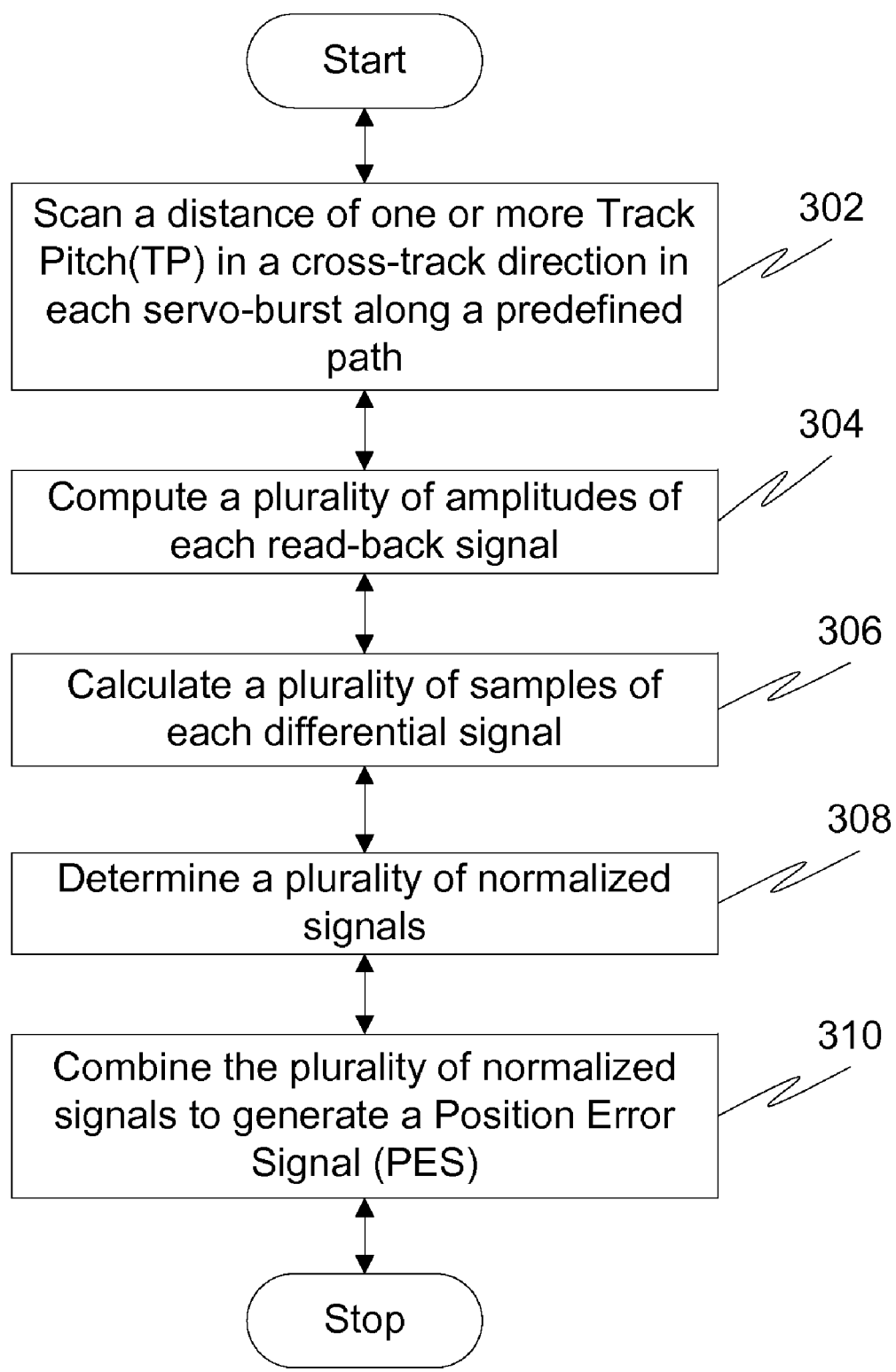
FIG. 3 is a flowchart of a method for generating a PES reference curve in a data storage device, in accordance with another embodiment of the present invention.

FIG. 3 is a flowchart of a method for generating a PES reference curve in a data storage device, in accordance with another embodiment of the present invention. At power up of the data storage device, each read-head in the data storage device is placed at a starting-point of a servo-burst. This has been explained in conjunction with FIG. 2.

After positioning each read head at the starting point of a servo-burst, a read-head scans a distance of one or more TPs in a cross-track direction in each servo-burst along the predefined path, at step 302. This has been explained in conjunction with FIG. 2. While scanning a distance of one or more TPs in a cross-track direction in each servo-burst a read-back signal is obtained corresponding to each servo-burst. Thereafter, at step 304, a plurality of amplitudes are computed for each read-back signal. The plurality of amplitudes are stored in memory 118. This has been explained in conjunction with FIG. 2.

Thereafter, based on the plurality of amplitudes stored in memory 118, a plurality of samples of each differential signal are calculated, at step 306. A differential signal corresponds to a first read-back signal and a second read-back signal. A differential signal is one of an in-phase signal and a quadrature signal. A sample of the differential signal is equal to a difference between a first amplitude, which is computed for the first read-back signal and a second amplitude, which is computed for the second read-back signal. The first read-back signal corresponds to a first servo-burst and the second read-back signal corresponds to a second servo-burst. This is has been explained in conjunction with FIG. 2.

Each sample of each differential signal is divided by a normalization constant to determine a plurality of normalized signals, at step 308. This has been explained in conjunction with FIG. 2. Thereafter, the plurality of normalized signals are combined to generate the PES reference curve using an algorithm, at step 310. The plurality of normalized signals include one or more of the normalized in-phase signal and the normalized quadrature signal. Each value of the PES reference curve is multiplied with the predefined value that is proportional to TP and is represented as a position offset of a read-head from a TCL of a data-track. This has been explained in conjunction with FIG. 2. The position offset is thereafter used by actuator 116 to move each read-head in the second set of read heads on a TCL of a data-track in a corresponding storage field.

Figure 4:
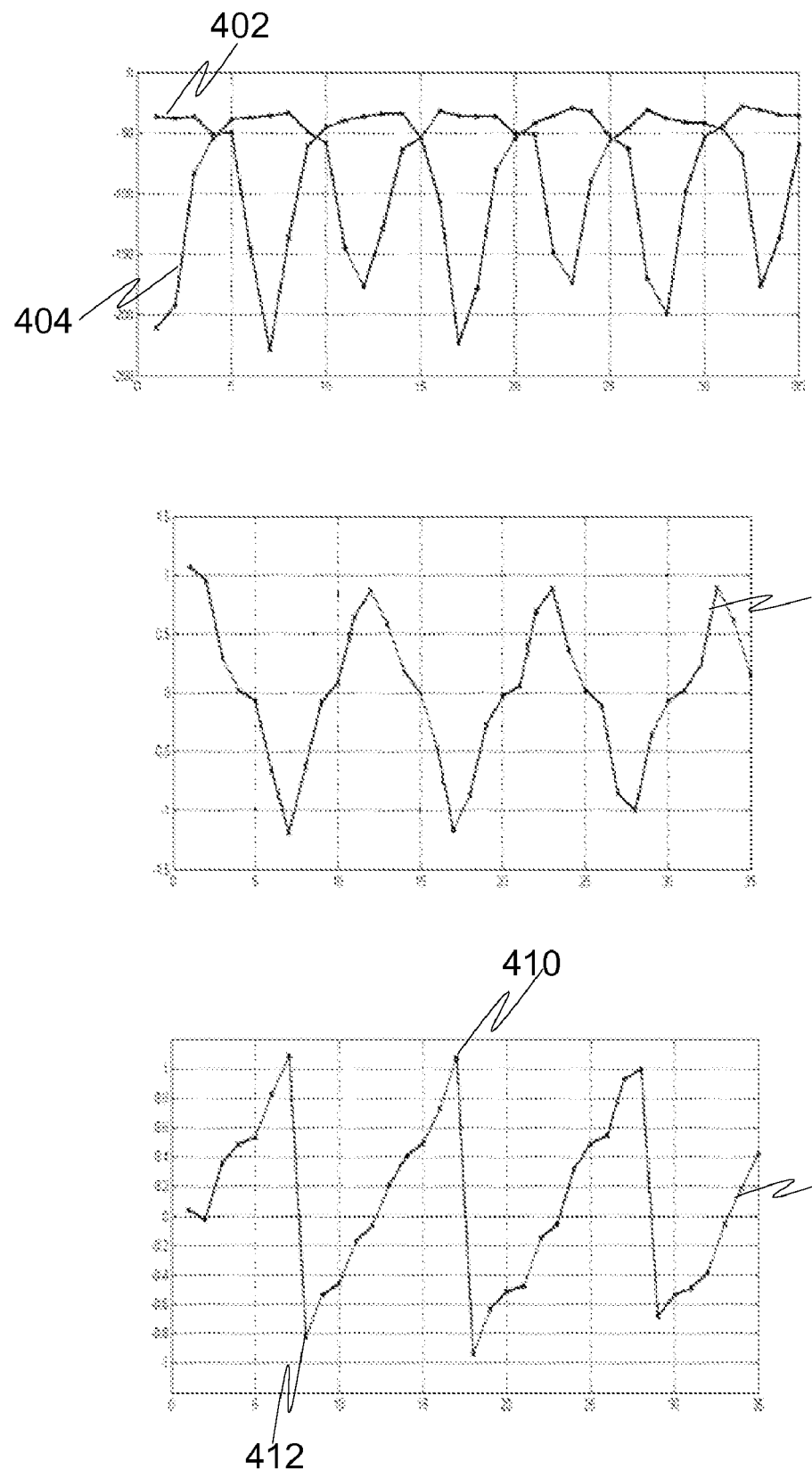
FIG. 4 is a set of graphs showing a plurality of amplitudes of a first read-back signal and a second read-back signal, a normalized signal, and a PES reference curve, in an exemplary embodiment of the present invention.

FIG. 4 is a set of graphs showing a plurality of amplitudes of a read-back signal 402 and a read-back signal 404, a normalized signal 406, and a PES reference curve 408, in an exemplary embodiment of the present invention. Read-back signal 402 is obtained when the first read head scans the first storage field. Read-back signal 404 is obtained when the second read head scans the second storage field. As a servo-track of the first storage field has an offset of TP/2 with respect to a corresponding servo-track of the second storage field, therefore, when a magnitude of read-back signal 402 is maximum, then a corresponding magnitude of read-back signal 404 is minimum. Similarly, when a magnitude of read-back signal 402 is minimum, then a corresponding magnitude of read-back signal 404 is maximum. A magnitude of a read-back signal corresponds to absolute value of an amplitude of a read-back signal.

Difference is computed between each amplitude of read-back signal 402 and a corresponding amplitude of read-back signal 404 to generate a differential signal. The differential signal is divided by a normalization constant to determine normalized signal 406. The normalization constant is equal to an average of the maximum-magnitude of read-back signal 402 and the maximum-magnitude of read-back signal 404. The amplitude of normalized signal 406 ranges between –1 to +1.

An algorithm is used to convert normalized signal 406 to PES reference curve 408. This has been explained in conjunction with FIG. 2. The amplitude of the PES reference curve 408 ranges between –1 to +1. Additionally, the PES reference curve 408 has a linear slope between two extreme amplitude values. For example, the PES reference curve 408 has a linear slope between an amplitude 410 and an amplitude 412. Thereafter, PES reference curve 408 is multiplied by TP/2 to compute position offsets for each read-head in the second set of read heads from a TCL of a data-track in a corresponding storage field. For example, amplitude 410 has a value of +1, therefore, the position offset at this point corresponds to TP/2*(+1), i.e., TP/2. As a result of this, at this point in the curve, each read-head from the second set of read heads has an offset of TP/2 from a TCL of a data-track in a corresponding storage-field.

Various embodiments of the present invention provide a method and system to generate a PES reference curve in a data storage device. This PES reference curve is used as a reference, based on which actual position offsets of read heads from the closest TCL of a data-track can be computed, during normal operation of a storage device. In particular, during an actual read or write operation, samples of readback signals from at least two servo-bursts are obtained from corresponding read heads, these samples are then subtracted to form samples of a plurality of differential signals, then normalized by using the corresponding normalization constant stored in memory, as a result of the method of this invention. From the normalized differential signal samples a PES sample is calculated and converted to a position offset from the TCL of the closest track in the cross-track direction. The position offset is then used to move each read-head on a TCL of a data-track in a corresponding storage field. Further, a variation in the shape of the topographical features and the tips of the read-heads does not lead to a deterioration of the performance of the positioning sub-system, as the PES reference curve is computed periodically after predetermined time intervals.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method for generating a Position Error Signal (PES) reference curve in a data storage device, the method comprising:

scanning a distance of at least one Track Pitch (TP) in a cross-track direction in each servo-burst along a predefined path, wherein a TP is a vertical cross-track distance between adjacent Track Centre Lines (TCLs) in a storage field, each servo-burst is pre-written on a storage medium in the data storage device, each servo-burst comprises at least one servo-track, wherein each servo-track comprises a plurality of topographical features, wherein data is stored on the storage medium as the plurality of topographical features, the at least one TP in a servo-burst is scanned with a read head;

calculating a plurality of differential signal samples, wherein a differential signal corresponds to a first read-back signal and a second read-back signal, a sample of the differential signal being equal to a difference between a corresponding first amplitude and a second amplitude and each sample including an in-phase sample and a corresponding quadrature sample having a 90-degree phase shift relative to the in-phase sample, wherein the first amplitude is computed for a first read-back signal corresponding to a first servo-burst, the second amplitude is computed for a second read-back signal corresponding to a second servo-burst, wherein a servo-track of the first servo-burst has an offset of TP/2 in the cross-track direction relative to a servo-track of the second servo-burst, an amplitude of a read-back signal is computed when a read head is moving parallel to at least one servo-track of a servo-burst;

determining a plurality of normalized samples by normalizing each in-phase sample and corresponding quadrature sample to obtain a plurality of normalized in-phase samples and corresponding normalized quadrature samples by dividing each sample of each differential signal by a normalization constant, wherein the normalization constant is an average of a maximum magnitude of the first read-back signal and a maximum magnitude of the second read-back signal; and combining the plurality of normalized in-phase samples and corresponding normalized quadrature samples to generate the PES reference curve.

2. The method of claim 1 further comprising computing a plurality of amplitudes of each read-back signal, wherein a read-back signal is obtained by scanning a distance of at least one TP in the cross-track direction in a servo-burst, each amplitude of the read-back signal corresponds to the cross-track distance of the read head relative to at least one topographic feature on the at least one servo-track of the servo-burst.

3. The method of claim 2, wherein magnitude of a read-back signal for a servo-burst is maximum when a read head is on a TCL of a servo-track of the servo-burst.

4. The method of claim 2, wherein magnitude of a read-back signal for a servo-burst decreases with increase in distance of a read head relative to a TCL of a servo-track of the servo-burst.

5. The method of claim 2, wherein the plurality of amplitudes of each read-back signal are stored in a memory.

6. The method of claim 1, wherein the predefined path comprises periodically moving the read head parallel to at least one servo-track of a servo-burst for a first predefined time, the read head is moved perpendicular to the at least one servo-track of the servo-burst for a second predefined time, wherein the read head is moved perpendicular after each movement of the read head parallel to the at least one servo-track.

7. The method of claim 1, wherein the at least one TP in the cross-track direction in each servo-burst is scanned each time the data storage device is powered up.

8. The method of claim 1, wherein the at least one TP in the cross-track direction in each servo-burst is scanned periodically after a predefined time period.

9. The method of claim 1, wherein each value of the PES reference curve is multiplied with a predefined value to represent each value of the PES reference curve as a position offset of a read head from a TCL of a data-track, the predefined value is proportional to TP, each data-track stores user-data as a plurality of topographical features, wherein data-tracks corresponding to different read heads are aligned in the cross-track direction.

10. The method of claim 9, wherein the predefined value is TP/2.

11. The method as claimed in claim 1, wherein the step of combining the normalized in-phase samples and corresponding normalized quadrature samples is performed for each pair of a normalized in-phase sample and corresponding normalized quadrature sample by multiplying a first constant by the sign of such normalized quadrature sample and multiplying by the difference between the normalized in-phase sample and a second constant.

12. The method as claimed in claim 11, wherein the first constant is less than unity and the second constant is greater than the first constant.

13. The method as claimed in claim 12, wherein the first constant is equal to 0.5 and the second constant is equal to 1.0.

* * * * *